United States Patent [19]

Kataoka et al.

[11] Patent Number: 4,541,703

[45] Date of Patent: Sep. 17, 1985

[54] ELECTRONIC FLASH PHOTOGRAPHIC DEVICE

[75] Inventors: Hiroyuki Kataoka, Saitama; Masanori Yamada; Nobuyuki Suzuki, both of Kanagawa, all of Japan

[73] Assignee: Canon Kabushiki Kaisha, Tokyo, Japan

[21] Appl. No.: 454,334

[22] Filed: Dec. 29, 1982

[30] Foreign Application Priority Data

Jan. 5, 1982 [JP] Japan .................................. 57-42
Jan. 9, 1982 [JP] Japan ............................... 57-1964

[51] Int. Cl.$^4$ .............................................. G03B 7/097
[52] U.S. Cl. .................................... 354/415; 354/416; 354/458; 354/459
[58] Field of Search ............... 354/33, 34, 60 F, 139, 354/160 L, 415, 416, 423, 458, 459; 315/151, 241 P, 329

[56] References Cited

U.S. PATENT DOCUMENTS

| 4,078,242 | 3/1978 | Uchiyama et al. | 354/60 F X |
| 4,200,370 | 4/1980 | Aizawa et al. | 350/60 F X |
| 4,230,402 | 10/1980 | Uchiyama et al. | 354/33 |
| 4,319,814 | 3/1982 | Iura et al. | 354/416 |
| 4,327,978 | 5/1982 | Ishida et al. | 354/415 |
| 4,345,827 | 8/1982 | Stemme et al. | 354/60 L X |
| 4,349,260 | 9/1982 | Ishida et al. | 354/415 |
| 4,465,353 | 8/1984 | Yoshida et al. | 354/415 |

Primary Examiner—L. T. Hix
Assistant Examiner—Della Rutledge
Attorney, Agent, or Firm—Toren, McGeady, Stanger, Goldberg & Kiel

[57] ABSTRACT

In an automatic electronic flash device of the computer type for a camera, information on the F-number of full aperture of a lens mounted on the camera is transmitted to the flash device and, in the case where the full aperture F-number of the lens is larger than a predetermined full aperture F-number, the light control level of the flash device is changed according to the full aperture F-number of the lens.

8 Claims, 9 Drawing Figures

ELECTRONIC FLASH PHOTOGRAPHIC DEVICE

BACKGROUND OF THE INVENTION

1. Field of the Invention

This invention relates to an electronic flash device for a photographic camera and, particularly, to an electronic flash device arranged to determine an aperture value through a preliminary flashing action and to set the light control level of a main flashing action in accordance with the aperture value. The term "light control level" as used herein for the purpose of this invention means a predetermined value of quantity of light received at which the main flashing action is to be stopped.

2. Description of the Prior Art

There have been proposed electronic flash devices of the kind arranged to determine an aperture value of a phototaking lens according to the quantity of a reflection light received as a result of a preliminary flashing action thereof and then to perform a main flashing action at a light control level corresponding to the aperture value. There has also been proposed a flash device in which a preliminary flashing action is performed when a shutter release button of the camera is depressed to the first stroke position thereof; then, it is confirmed whether an object to be photographed is located at a distance within a light control range, that is, whether the distance between the camera on which the flash device is mounted and the object to be photographed is within a light controllable range which is, for example from 0m to 8m if the guide number of the flash device is 16 and, if the aperture value designated by the flash device is F2.0, the confirmation is arranged to be made, for example, through a display of an aperture value then selected; and after this has been confirmed, a flash photographing operation is carried out by further depressing the shutter release button to a second stroke position thereof.

Generally, in the case of a flash device having a guide number 16, the designated aperture is in the following relation to the light control range:

| Designated aperture: | F 2.0 | F 4.0 | F 8.0 |
|---|---|---|---|
| Light control range D: | 0 m < D < 8 m | 0 m < D < 4 m | 0 m < D < 2 m |

With the above stated flash device used, therefore, the aperture of the phototaking lens is set at F2.0 when the preliminary flashing action is performed on an object located at a distance D which is 4m<D<8m. Then, the flash device is set at a light control level corresponding to this aperture value. Meanwhile, a display allows the photographer to confirm that the object is located within the light controllable distance range. Under this condition, when a flash photographing operation is performed by approaching the object, for example, to a point of 0m<D<4 m from the object, a proper exposure is obtainable if the lens is brighter than F2.0 and can be set at F2.0. However, if the lens is of a full aperture F-number of F4.0, for example, the aperture value of the lens gives an under-exposure by two steps because the light control level has been set at a value corresponding to F2.0. This presents a serious problem in cases where flash photographing must be carried out by moving a camera closer to or farther away from an object to be photographed by using various kinds of interchangeable lenses.

SUMMARY OF THE INVENTION

It is, therefore, an object of the present invention to provide an improved electronic flash photographic device which obviates the disadvantages of prior art devices.

It is another object of the invention to provide an electronic flash photographic device, wherein the aperture of a phototaking lens is determined according to the quantity of a reflection light received as a result of preliminary flashing; main flashing control is performed at a light control level corresponding to the aperture value; meanwhile, a signal representative of the full aperture F-number of the phototaking lens mounted on the camera is transmitted to the flash device; and then the light control level of the flash device is corrected according to the full aperture F-number of the lens so that a proper exposure can be ensured.

These and further objects and features of the present invention will become apparent from the following detailed description of embodiments thereof taken in conjunction with the accompanying drawings.

DESCRIPTION OF THE PREFERRED EMBODIMENT

Figure 1:
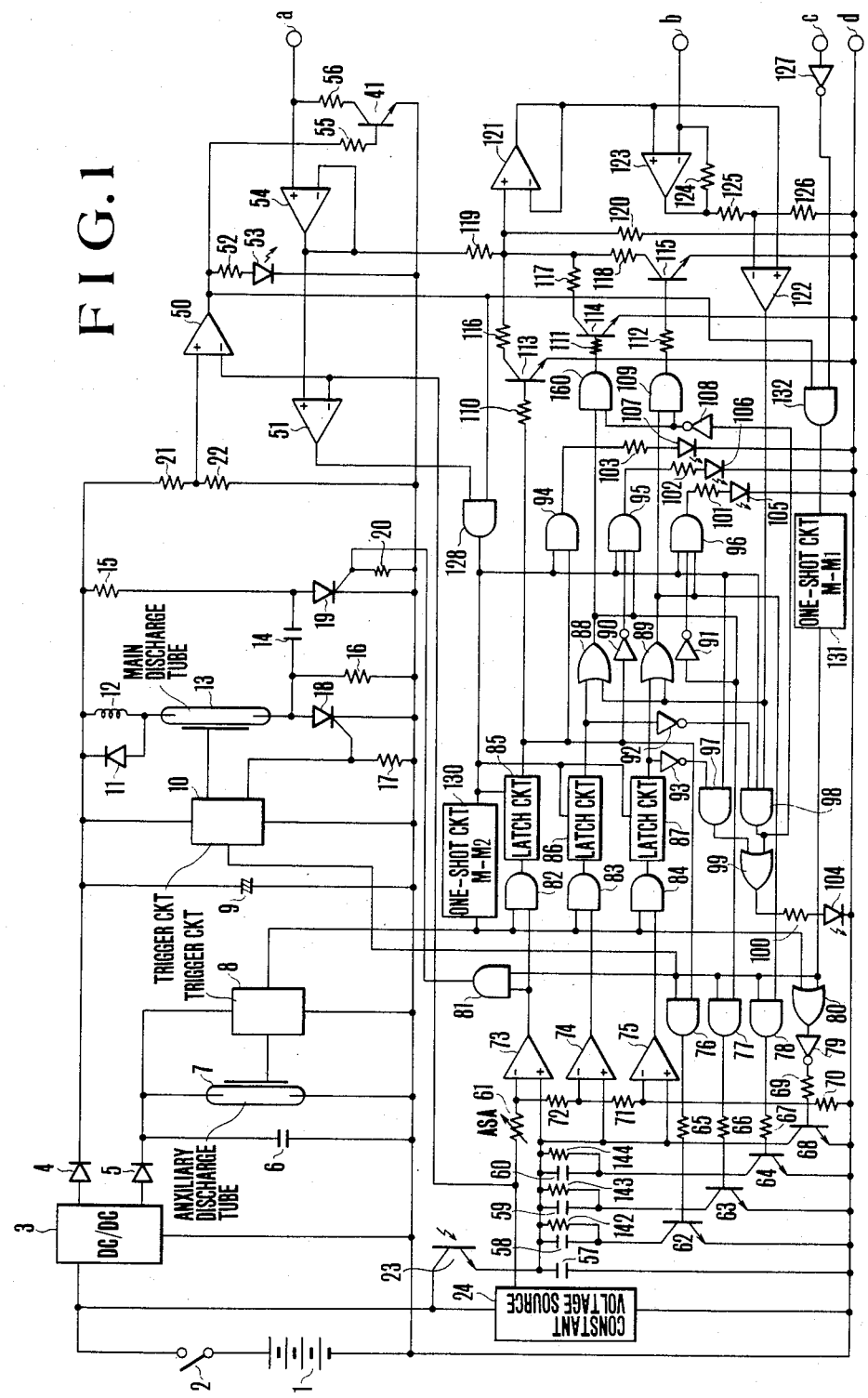
FIG. 1 is a circuit diagram of a flash device included in a flash photographic system embodying the present invention.

Referring to FIG. 1 which is a circuit diagram showing a flash device in a flash photographic system embodying the present invention, the flash device includes a power source switch 2 which is of a normally open type and is series connected to a battery 1. To the switch 2 is connected a known DC-DC converter 3 which is arranged to boost the low voltage of the battery 1. Two rectifying diodes 4 and 5 are connected to the converter 3. The anode of a main thyristor 18 is connected to the cathode side of the diode 4 through a coil 12 and a main discharge tube 13 for flash photographing. To the cathode side of the diode 5 is connected a parallel circuit consisting of an auxiliary discharge tube 7 for distance measurement and an auxiliary capacitor 6 which is arranged to supply the discharge tube 7 with flashing energy. This auxiliary discharge tube 7 has a trigger circuit 8 connected to the trigger electrode thereof. The trigger circuit 8 has a monostable multivibrator 130 connected to the input terminal thereof. Meanwhile, the above stated main discharge tube 13 has a main capacitor 9 which accumulates flashing energy connected in parallel thereto. A known trigger circuit 10 is connected to the trigger electrode of the main discharge tube 13. A second output terminal of the trigger circuit 10 is connected to the gate of the above stated main thyristor 18 and to a resistor 17 which is connected to the gate of the trigger circuit 10. Resistors 15 and 16 form a charging path for a commutation capacitor 14. Of these resistors, the resistor 15 is connected also to the anode of an auxiliary thyristor 19 which is arranged to cut off the main thyristor 18. A resistor 20 is connected to the gate of the auxiliary thyristor 19. Resistors 21 and 22 are provided for a voltage dividing circuit which is parallel connected to the main capacitor 9 for the purpose of detecting the charge voltage of the main capacitor 9. There is provided a photo-transistor 23 for receiving a reflection light coming from an object to be photographed (not shown). The photo-transistor 23 is connected to a constant voltage source 24 and to a distance measurement capacitor 57 which is of a relatively small capacity. The above stated voltage dividing circuit 21 and 22 has a comparator 50 connected to the output terminal thereof. The negative input terminal (−) of this comparator 50 and that of another comparator 51 are connected to the output terminal of the constant voltage source 24 to receive a reference voltage therefrom. A light emitting-diode 53 (hereinafter a light emitting diode will be called LED for short) is connected to the output terminal of the comparator 50 through a resistor 52 for the purpose of indicating completion of a charging process on the main capacitor 9. A buffer circuit 54 is connected to a connection terminal a which is in turn connected to a terminal disposed on the camera side. The output terminal of the buffer circuit 54 is connected to the positive input terminal (+) of the comparator 51 which is arranged to detect whether or not a shutter release button which will be described hereinafter is depressed to a first stroke position thereof. An npn transistor 41 is connected to the terminal a through a resistor 56. The base of the transistor 41 is connected to the output terminal of the comparator 50 through a resistor 55. The emitter of the transistor 41 is connected to the negative electrode of the above stated battery 1. On the left hand side of the drawing, an element 58, which is series connected to a switching transistor 62, is a capacitor which forms a first time constant circuit of a photometric circuit included in a flash light quantity control circuit. An element 59, which is series connected to another switching transistor 63, is a second capacitor forming a second time constant circuit of the photometric circuit in the flash light quantity control circuit. Another element 60 which is series connected to a switching transistor 64 is a third capacitor forming a third time constant circuit of the photometric circuit for the flash light quantity control. Discharging resistors 142, 143 and 144 which are of high resistance values are respectively connected to these light quantity controlling capacitors 58, 59 and 60 to form an integration circuit for light quantity control. Compared with the afore-mentioned distance measurement capacitor, the light quantity control capacitors 58, 59 and 60 have a larger capacity. While the light control level of the light control integration circuit is arranged in three steps in this particular embodiment, the present invention is not limited to this arrangement. Base resistors 65, 66 and 67 are respectively connected to the bases of transistors 62, 63 and 64. There is provided an npn transistor 68 which becomes nonconductive at the same time as the start of preliminary flashing and that of main flashing to actuate the above stated photometric circuit concurrently with the starts of the preliminary and main flashing actions. A resistor 69 is connected to the base of this transistor 68. Comparators 73, 74 and 75 are arranged to select the light control level, i.e. an aperture value to be used. Resistors 70, 71 and 72 for supplying reference voltages are respectively connected to these comparators 73, 74 and 75. A resistor 61 is arranged to have its resistance value vary according to a setting value of film sensitivity. AND gates 76, 77 and 78 are respectively connected to the bases of transistors 62, 63 and 64 through the resistors 65, 66 and 67 for rendering one of these transistors 62–64 conductive in synchronism with generation of a flashing trigger signal which will be described hereinafter. An OR gate 80 is connected to the base of the switching transistor 68 through an inverter 79 and the resistor 69. An AND gate 81 is connected between the comparator 73 and the auxiliary thyristor 19 for the purpose of guiding to the gate of the auxiliary thyristor 19 a flashing stop signal produced from the comparator 73. There are further provided AND gates 82, 83 and 84 which are arranged to guide light control level selection signals, i.e. aperture value selection signals, produced from the comparators 73, 74 and 75 to latch circuits 85, 86 and 87 respectively. The output terminal of the AND gate 82 is connected to the gate of a thyristor which forms the latch circuit 85. The output terminal of the AND gate 83 is connected to the gate of a thyristor which forms the latch circuit 86. The output terminal of the AND gate 84 is connected to the gate of another thyristor which forms the latch circuit 87. With the latch circuits 85–87 thus formed by these thyristors, the anode of the thyristor forming the latch circuit 85 is connected to the output terminal of an AND gate 128 while the cathode thereof is connected to the base of a transistor 113 through a resistor 110. The anode of the thyristor forming the latch circuit 86 is connected to the output terminal of the AND gate 128 while the cathode thereof is connected to the base of a transistor 114 through an OR gate 88, an AND gate 160 and a resistor 111. Further, the anode of the thyristor forming the latch circuit 87 is connected to the output terminal of the AND gate 128 while the cathode thereof is connected to an OR gate 89. There are provided inverters 90, 91, 92 and 93. LED's (light emitting diodes) 105, 106 and 107 are connected to AND gates 94, 95 and 96 through resistors 101–103. These elements are arranged to indicate the selected light control level, or, in other words, the selected aperture value prior to main flashing. An inverter 108 is connected to AND gates 109 and 160. Base resistors 110–112 are connected to the bases of npn transistors 113–115. Resistors 116–118 are provided for the purpose of producing a voltage corresponding to the selected aperture value. A reference numeral 119 indicates a resistor. Another resistor 120 is provided for forming a voltage dividing circuit which is parallel connected respectively to the above stated resistors 116–118. A buffer circuit 121 is connected to the connection point of the above stated resistors 119 and 120 which voltage divide the output of the above stated buffer circuit 54. This buffer circuit 121 is arranged to have the voltage of its non-inversion input terminal produced therefrom as it is. A comparator 122 is arranged to determine a signal of the full aperture F-number Of the lens received from the camera side through a terminal b. Resistors 125 and 126 form a voltage dividing circuit for supplying a reference voltage to the negative input terminal of this comparator 122. An operational amplifier 123 has its non-inversion input terminal connected to the output terminal of the above stated buffer circuit 121 and also has a resistor 124 connected between its output terminal and its inversion input terminal. The operational amplifier 123 is arranged such that the non-inversion input terminal voltage thereof is produced without any change at the inversion input terminal thereof. In other words, the voltage of its non-inversion input terminal becomes an aperture signal to be supplied from the flash device to the camera side through the terminal b as will be further described later herein.

The above-mentioned comparator 122, bleeder resistors 125 and 126 and the above-mentioned amplifier 123 constitute a detection circuit which detects the information on the full aperture F-number of the lens is disposed on the camera side. The above-mentioned terminal b is connected to a source of the maximum or full aperture F-number information disposed on the camera side. The above-mentioned detection circuit is arranged to detect the full aperture F-number of the lens by detecting the value of the impedance Z of the full aperture F-number information source. Meanwhile, the comparator 122 is arranged to produce a low level signal when the full aperture F-number of the lens is or a smaller value than the desiganted aperture value, that is, when the lens is brighter than the designated aperture value and to produce a high level signal when the lens is darker than the aperture value.

Between a synchronizing terminal c for a flashing trigger signal and the input terminal of an AND gate 132, there is connected an inverter 127. A monostable multivibrator 131 (hereinafter a monostable multivibrator will be called a one-shot circuit) is connected to an OR gate 80. Numerals 97 and 98 indicate AND gates; and 104 indicates and LED. The LED 104 is connected to an OR gate 99 through a current limiting resistor 100 and is arranged to give a warning against an under exposure. The terminal a mentioned in the foregoing is arranged to be supplied with a constant voltage from the camera side when the shutter release button of the camera is depressed to the first stroke position thereof. With this constant voltage thus supplied to the terminal a, the terminal a uses this voltage for transmitting either a photographing mode change-over signal or a shutter time change-over signal to the camera side as will be described later herein. The terminal b which transmits the voltage corresponding to the selected aperture value from the flash device to the camera side as mentioned in the foregoing also serves to have a signal which represents the full aperture F-number of the phototaking lens in use and comes from the camera side transmitted therethrough to the processing circuit of the flash device. The synchronizing terminal c is arranged in a known manner. Another terminal d is a grounding terminal.

Figure 2A:
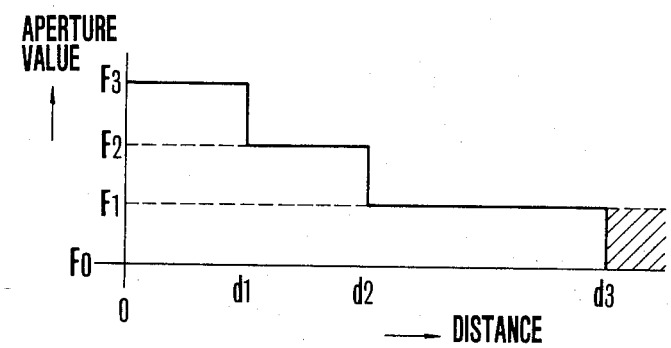
FIGS. 2(a), 2(b), 3(a), 3(b) and 3(c) are illustrations of the operation of the flash device shown in FIG. 1.
Figure 2B:
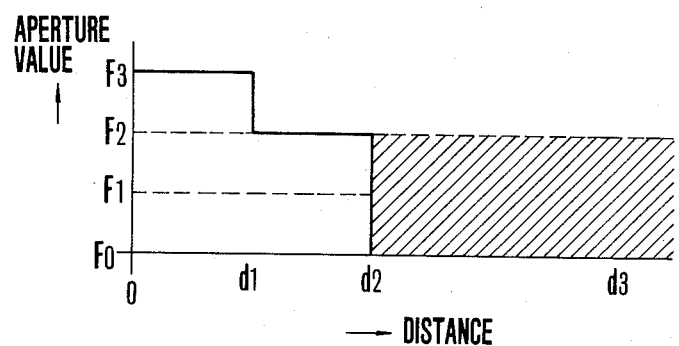

To make the present invention more easily understandable, the operation of the flash device arranged as described above will be described below with reference to FIGS. 1 through 3 before description of the camera of the flash photographic system according to the invention:

Referring to FIGS. 2(a) and 2(b) which show the relation of the distance from the flash device to an object to be photographed to the aperture value to be selected, FIG. 2(a) shows the relation as it obtains when a relatively bright lens is used while FIG. 2(b) shows the relation as it obtains when a relatively dark lens is used. In these drawings, the axis of abscissa indicates the distance while the axis of ordinate indicates the aperture value.

Figure 3A:
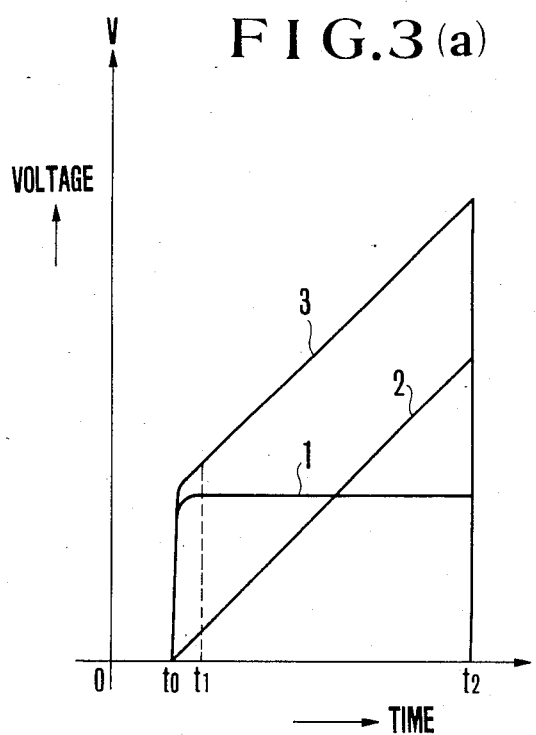
Figure 3B:
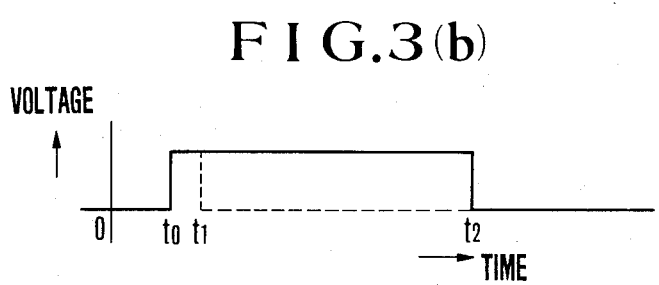
Figure 3C:
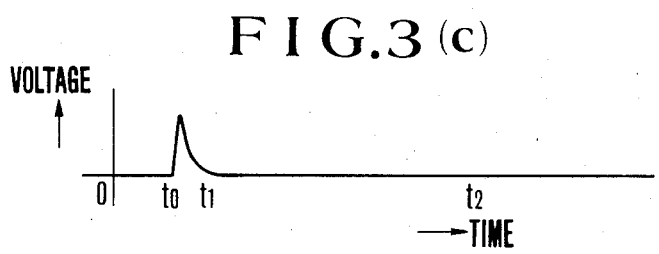

FIG. 3(a) shows the charge voltage characteristic of the distance measurement capacitor 57 with time shown by the axis of abscissa and the carge voltage by the axis of ordinate. In FIG. 3(b) which shows the output wave form of the one-shot circuit 130, the generation period t0–t2 thereof is, for example, several ten μs. In FIG. 3(c) which shows the charge characteristic of the auxiliary discharge tube 7, the discharge time t0–t1 thereof is, for example, about 10 μs. Referring to FIG. 3(a), a line 1 represents variations in the charge voltage of the capacitor 57 in a case where light measuring time is several tens of μs, the brightness of a natural light illuminating the object is low and the object is located at a medium distance. A line 2 represents the variations in a case where the light measuring time is the same as the line 1, the object is located at a long distance and the brightness of the natural light is high. Another line 3 represents the variations in a case where the light measuring time is the same as the line 1, the brightness of the natural light is high and the object is located at a medium distance. Comparison of these lines or wave forms 1 and 3 indicates that, where the light measuring time is about 10 μs, the variations in the charge voltage of the capacitor 57 are under the influence of a reflection light which comes from the object and solely result from flashing, i.e. the variations are influenced by the components of the reflection light resulting from the reflection factor of the object and the measuring distance. However, the variations come to be more and more influenced by the natural light on the background of the object according as the light measuring time increases. Accordingly, in the case of the line 3 or wave form 3 shown in FIG. 3(a), flash photographing at an exposure which is adequate not only for the flash light but also for the natural light can be accomplished by changing the light measuring time, i.e. the one-shot pulse width, and thus by setting an aperture value according to the reflection light components resulting from the distance, the reflection factor of the object and the natural light on the background. This arrangement gives an especially good effect for a back-light shot.

First, in the case where the phototaking lens mounted on the camera is a relatively bright lens, the embodiment operate in the following manner: The impedance of the information source of the full aperture F-number of the camera is detected in a manner as will be described later herein. Then, in this case, the comparator 122 produces a low level signal therefrom. Assuming that the resistance value of the resistor 125 is R1, that of the resistor 126 R2, that of the resistor 124 R3, the impedance between the terminal b on the camera side and the ground is Z, the voltage of the terminal b on the flash device side is $V_{AV}$, the output of the amplifier 123 $V_{OUT}$ and the potential at the connection point of the resistors 125 and 126 is Vr, there obtains the following relation:

$$Vr = V_{OUT}\frac{R2}{R1 + R2} \quad V_{OUT} = V_{AV}\left(1 + \frac{R3}{Z}\right)$$

Since the condition under which the output of the comparator 122 become a low level (hereinafter will be called LL) is $Vr > V_{AV}$, there obtains the following relation:

$$V_{AV}\left(\frac{R2}{R1 + R2}\right)\left(1 + \frac{R3}{Z}\right) > V_{AV}$$

Then, this gives the following relation: Z<( R3R2/R1) =C (a constant value). Therefore, use of a bright lens can be considered to result in a relation Z<R2R3/R1 and that of a dark lens to result in a relation of Z>R2R3/R1.

As described above, the information on the full aperture F-number of the lens in use is transmitted from the camera side to the flash device via the terminal b through the variation in the impedance. Then, information on the light control aperture value is transmitted from the flash device to the camera side through the variation of voltage also via the terminal b. This arrangement permits reduction in the number of connection terminals required between the camera and the flash device.

The following description is based on the assumption that the phototaking lens mounted on the camera is a bright lens, such as a lens of full aperture F-number between F1.4 and F2.0; the output of the comparator 122 is at an LL; the output of the AND gate 98 is also at an LL; and the output of the inverter 108 is at a high level (hereinafter will be called HL for short). Let us also assume that the guide number of the flash device is, for example, 16.

With the flash device shown in FIG. 1 mounted on a hot shoe (not shown) of the camera, when the power source switch 2 is closed, the DC-DC converter 3 and the constant voltage source 24 begin to operate. The main capacitor 9, the auxiliary capacitor 6, etc. begin to be charged. When the charge voltage of the main capacitor 9 reaches a predetermined value to cause the output level of the comparator 50 to change from LL to HL, the LED 53 lights up to indicate completion of the charging process on the main capacitor 9. Then, a high level voltage of is impressed on the base of the transistor 41 to render the transistor 41 conductive.

Following this, a constant voltage is impressed on the terminal a via the hot shoe of the camera when the photographer depresses the shutter release button (not shown) to the first stroke position thereof. (With the shutter release button in this position, a release action on the shutter and an adjusting action on the aperture of the phototaking lens do not begin. It is only a photometric circuit, a display circuit, etc. arranged within the camera that begin to operate then). With the constant voltage impressed the transistor 41 becomes conductive and a shutter time change-over signal is transmitted to the camera side to shift the shutter time control circuit of the camera from a natural light photography mode to a flash photography mode as will be further described later herein. Meanwhile, the constant voltage produced at the terminal a is also impressed on the positive input terminal (+) of the comparator 51 through the buffer circuit 54. This causes the output level of the comparator 51 to change from an LL to an HL. This causes the one-shot circuit 130 to be triggered through the AND gate 128. The circuit 130 then produces an HL output voltage over a predetermined period of time t2–t0 which is, for example, several tens of μs as shown in FIG. 3(b). Accordingly, the trigger circuit 8 is triggered the instant the pulse is produced from the one-shot circuit 130. With the trigger circuit 8 thus triggered, the output terminal of the circuit 8 produces a trigger pulse, which triggers the auxiliary discharge tube 7. Since the auxiliary capacitor 6 has been charged to a sufficiently high voltage at that instant, a current flows from the capacitor 6 to the auxiliary discharge tube 7 upon receipt of the trigger pulse. The tube 7 then begins to perform a preliminary flashing action.

Meanwhile, the pulse output from the one-shot circuit 130 is also impressed on the AND gates 82–84 and the OR gate 80. This brings the AND gates 82–84 into a waiting state and also renders the transistor 68 non-conductive through the inverter 79 and the resistor 69. With the transistor becoming non-conductive, the distance measuring capacitor 57 is released from a short-circuit state. Then, the distance measuring photometric circuit begins to operate concurrently with the commencement of the preliminary flashing action mentioned above. Further, since the flashing trigger signal of LL is not impressed on the synchronizing terminal c at that time, the one-shot circuit 131 remains inoperative and the gates of the AND circuits 76–78 are closed. Accordingly, all the transistors 62–64 remain non-conductive and all the light controlling capacitors 58–60 are inoperative. In other words, it is only the integrating capacitor 57 that is operating.

After preliminary flashing has begun, when the light from the discharge tube 7 is reflected by the object and comes to the photo-transistor 23, the output voltage of the distance measuring capacitor 57 increases with time and according to a photo current flowing through the photo-transistor 23. About several tens of μs after the commencement of the preliminary flashing the charge voltage of the capacitor 57 during the distance measuring process is latched at the latch circuits 85–87 as distance information as the output level of the one-shot circuit 130 changes to LL. If the object is located at a distance within the distance range of d2m–d3m (for example, 4m–8) as shown in FIG. 2(a) with the guide number of the flash device assumed to be 16 as mentioned in the foregoing, the charge voltage of the capacitor 57 causes the output level of the comparator 75 alone to become HL. This in turn causes the output level of the latch circuit 87 alone to become HL. Therefore, the output levels of the output terminals of the OR gate 89 and the AND gate 109 respectively become HL. Then, the transistor 115 alone becomes conductive to parallel connect the resistor 118 to the resistor 120. At this point of time, since the constant voltage from the terminal a has been impressed through the buffer circuit 54 on the resistors 119 and 120, the potential of the positive input terminal of the buffer circuit 121 drops according to the resistance value of the resistor 118 if the resistor 118 which is for setting the aperture value at F1, corresponding to F2.0 for example, is then parallel connected to the resistor 120. Then, the potential of the non-inversion input terminal of the amplifier 123 also drops accordingly. As a result of that, a voltage which causes the aperture of the phototaking lens of the camera to be adjusted to the aperture value F1 is produced at the terminal b.

With the output level of the OR gate 89 having become HL as mentioned above, the output level of the AND gate 78 becomes HL and the transistor 64 becomes conductive. In other words, the flash light quantity control circuit of the flash device becomes ready to be set at a light control level corresponding to the aperture value F1.

Further, when the output level of the OR gate 89 becomes HL, the output levels of the comparator 51 and the AND gate 128 become HL and that of the latch circuit 86 LL. Therefore, the output level of the AND gate 96 becomes HL. The LED 105 lights up to inform the photographer that the aperture of the phototaking lens of the camera and the light control level (or aperture value) of the flash device will be adjusted to the above stated aperture value F1.

In case where the distance to the object is within another distance range d2m-d1m (for example, between 2m and 4m) shown in FIG. 2(a), the charge voltage of the capacitor 57 causes the output level of the comparator 75 and that of the comparator 74 to become HL. Accordingly, the output levels of the latch circuits 86 and 87 become HL and, therefore, those of the AND gates 160 and 109 are caused to become HL through the OR gates 88 and 89. The transistors 114 and 115 then become conductive. With these transistors 114 and 115 becoming conductive, the aperture setting resistors 117 and 118 are parellel connected to the resistor 120 of the voltage dividing circuit. With the resistors 117 and 118 thus parallel connected to the resistor 120, the potential of the positive input terminal of the buffer circuit 121 drops to an extent according to the resistance value of the two resistors 117 and 118 now parallel connected to the resistor 120. The potential of the non-inversion input terminal of the amplifier 123 also drops accordingly.

As a result of this, there is produced at the terminal b a voltage of such a value that causes the aperture of the phototaking lens of the camera to be adjusted to an aperture value F2 which is smaller than the aperture value F1 (see FIG. 2(a)) and, for example, corresponds to F4.0. Further, when the output levels of the OR gates 88 and 89 become HL as mentioned above, the level of one of input terminals of each of the AND gates 77 and 78 becomes HL to render the transistors 63 and 64 conductive respectively. The flash device thus becomes ready to be set for the above stated aperture value F2.

When the output levels of the OR gates 88 and 89 change to HL as mentioned above, the output level of the AND gate 128 becomes HL and that of the latch circuit 85 LL. Therefore, among the AND gates 94-96, the output level of the gate 95 alone becomes HL. Then, the LED 106 lights up to inform the photographer that the aperture of the phototaking lens of the camera and the light control level (or aperture value) of the flash device will be adjusted to the above stated aperture value F2.

If the distance to the object is within a range d1m-0m shown in FIG. 2(a) which corresponds, for example, to 0m-2m, the charge voltage of the capacitor 57 causes the output levels of the comparators 75, 74 and 73 to respectively become HL. Accordingly, the output levels of all the latch circuits 85-87 become HL. The output levels of the OR gates 88 and 89 and those of the AND gates 109 and 160 become HL. The transistors 113-115 ome conductive to parallel connect the aperture value setting resistors 116, 117 and 118 to the resistor 120 of the voltage dividing circuit. With the resistors 116-118 parallel connected the resistor 120, the potential of the positive input terminal of the buffer circuit 121 drops to an extent according to the resistance value of the resistors 116-118 parallel connected the resistor 120. The potential of the non-inversion input terminal of the amplifier 123 also drops according as that of the buffer circuit 121 drops.

As a result of this, at the terminal b, there is produced such a voltage that causes the aperture of the phototaking lens of the camera to be adjusted to an aperture value F3 which is smaller than the above stated aperture value F2 (see FIG. 2(a) which corresponds, for example to F8.0 in F-number.

With the output level of the latch circuit 85 becoming HL and those of the OR gates 88 and 89 having become HL as mentioned in the foregoing, the level of one of input terminals of each of the AND gates 76, 77 and 78 becomes HL to render the transistors 62-64 conductive respectively. In other words, the flash device thus becomes ready to be set for the above stated aperture value F3.

Since the output of the AND gate 128 is at an HL with that of the latch circuit 85 having become HL, the LED 107 alone lights up to inform the photographer that the phototaking aperture of the camera and the light control level (aperture value) of the flash device will be adjusted to the above stated aperture value F3.

Further, since the output of the latch circuit 85 is then at an HL as mentioned above, the output of the inverter 90 is at an LL. Accordingly, the output level of the AND gate 95 becomes LL and the LED 106 does not light up. Further, since the output of the latch circuit 86 is at an HL as mentioned above, that of the OR gate 88 is at an HL and that of the inverter 91 is at an LL. Accordingly, the LED 105 also does not light up.

Again referring to FIG. 2(a), when the distance to the object is farther than a distance d3, none of the output levels of the comparators 73-75 become HL even after the lapse of time of several tens of $\mu s$ which is determined by the output of the one-shot circuit 130. In this case, therefore, the transistor 113 is kept in a non-conductive state by the LL output of the latch circuit 85. Since the output of the latch circuit 86 is at an LL, that of the AND gate 98 at an HL and that of the inverter 108 at an LL, the outputs of the AND gates 160 and 109 are at LL's. With the object located at such a distance, therefore, all the transistors 113-115 which are arranged to determine the aperture value of the phototaking lens (not shown) remain in their non-conductive states. Meanwhile, a voltage which corresponds to an aperture value F0 (see FIG. 2(a)), or F1.0 in F-number, for example, and which is determined by the voltage dividing ratio of the voltage dividing circuit 119 and 120 is transmitted from the amplifier 123 through the terminal b to an aperture control circuit of the camera which will be described later herein. Further, since the output of the latch circuit 87 is also at an LL and that of the AND gate 97 is at an HL at this moment, the LED 104 lights up to inform or warn the photographer that the object is beyond a flash photographing range.

When the shutter release button is released from the depressing operation and, after that, again is depressed to the first stroke position, a predetermined constant voltage is impressed on the terminal a from the camera side. Then, if the charging process on the main capacitor has been completed at that instant, again preliminary flashing is performed and again a distance measuring action is performed in the same manner as has been described in the foregoing.

In case where a dark lens, i.e. a lens of a relatively large F-number of full aperture such as F2.8 to F4.0, for example, is mounted on the single lens reflex camera (not shown), the embodiment operates in the following manner: The aperture of this dark lens cannot be adjusted, for example, to an aperture value corresponding to F2.0. Despite of that, if the light control lever of the flash device is set at a level corresponding to F2.0, an under exposure would result therefrom. This problem is solved in the following manner:

With such a lens mounted on the camera, the potential of the positive input terminal (+) of the comparator 122 is higher than that of the negative input terminal (−) of the comparator. Therefore, the level of the output terminal of the comparator 122 becomes HL. Then, the levels of the output terminals of the OR gates are forced to become HL. After completion of the charging process on the main capacitor 9, when the shutter release button (not shown) is depressed to the first stroke position thereof, the one-shot circuit 130 is triggered in the same manner as in the preceding case. The one-shot circuit produces an HL signal for a period of several tens of $\mu$s. The transistor 68 then changes to a non-conductive state as mentioned in the foregoing to render thereby the distance measuring photometric circuit operative. Meanwhile, when the HL signal is produced from the one-shot circuit 130, the discharge tube 7 flashes to perform the preliminary flashing in the same manner as has been described in the foregoing.

Under this condition, when the object is located at a distance farther than the distance d2 (see FIG. 3(b)) which is, for example, 4m, an HL input is impressed on one of the input terminals of each of the AND gates 77 and 78 because the output levels of the OR gates 88 and 89 have been forced to become HL by the HL output of the comparator 122. Therefore, the transistors 63 and 64 are in their conductive states. In other words, in the photometric circuit of the flash light quantity control circuit (hereinafter will be called the light control circuit), the capacitors 59 and 60 are selected. As a result of that, the circuit becomes ready to be set at a light control level for a relatively dark aperture value F2 which, for example, corresponds to F4.0 in F-number.

Although the output level of the OR gates 88 and 89 are HL, the LL output of the latch circuit 86 causes the level of the AND gate 98 to become HL. The transistors 114 and 115 then become non-conductive and resistors 119 and 120 are selected for aperture value setting. Accordingly, at the terminal b, there is produced a voltage of a value that causes the aperture of the phototaking lens to be adjusted to the aperture value F0. The lens is thus forcedly set at its full aperture.

More specifically stated, a lens the full aperture F-number of which is F2.8 is set at F2.8 while lenses of full aperture F-number F3.5 and F4.0 are respectively set at F3.5 and F4.0. Therefore, with the light control level of the flash device set through preliminary flashing for an object located at a distance within the range of d2–d3, or 4m–8m f for example, when flash photographing is performed by coming closer to the object, a proper exposure can be obtained by using a lens of F4.0. Even in cases where a lens of F2.8 or F3.5 is used under such conditions, a fairly good exposure can be obtained with the degree of insufficiency of exposure arranged to be less than one step of aperture. Further, a lens of F2.8 or F3.5 used, a nearly proper exposure can be obtained for an object located at a distance between d2 and d3 because the lens is brighter than a lens of F4.0.

Further, with the object under such a condition, the output level of the comparator 74 is LL and that of the latch circuit 86 is also LL. Therefore, the output level of the inverter 92 becomes HL. This causes the AND gate 98 to produce an HL output. The LED 104, therefore, lights up to warn the photographer that the object to be photographed is outside of the flash photographing range. Meanwhile, since the output levels of the comparator 73 and the latch circuit 85 are also LL, the inverter 90 produces an HL output. The levels of all the inputs of the AND gate 95 thus become HL. The LED 106 then lights up to inform the photographer that the light control level of the flash device will be adjusted to the aperture value F2, which corresponds to F4.0 in F-number.

When the object is located at a distance within the distance range of d1–d2 which corresponds, for example, to a range 2m–4m (see FIG. 2(b)), it is only the output levels of the comparators 74 and 75 that become HL. With the output level of the comparator 74 becoming HL, the output level of the latch circuit 86 changes to HL. The output level of the inverter 92 becomes LL, that of the AND gate 98 LL, that of the inverter 106 HL. Therefore, the output level of the AND gate 160 becomes HL when the output level of the latch circuit 86 becomes HL. The transistor 114 then becomes conductive to parallel connect the resistor 117 to the resistor 120. The output level of the AND gate 109 also becomes HL when the output level of the latch circuit 87 becomes HL. The transistor 115 also becomes conductive to parallel connect the resistor 118 to the resistor 120. Then, the amplifier 123 produces a voltage corresponding to the aperture value F2 which is determined by the voltage dividing ratio of the voltage dividing circuit 117, 118, 119 and 120. This voltage is transmitted to the camera side through the terminal b. Meanwhile, with the output levels of both the latch circuits 86 and 87 being HL, the LED 104 is extinguished to inform the photographer that flash photographing will be performed at a proper exposure. The photometric circuit of the light control circuit in this case also becomes ready to be set for the aperture value F2, or, for example, F4.0 in F-number, also in this case.

When the object is at a distance within the range of 0–d1 which corresponds, for example, to a range 0–2m (see FIG. 2(b), the output levels of all the comparators 73–75 change to HL. Then, with the output level of the latch circuit 86 thus becoming HL, the output level of the inverter 108 also becomes HL in the same manner as in the foregoing case. Therefore, the output levels of the AND gates 160 and 109 change to HL at the same time as those of the latch circuits 86 and 87 change to HL. The aperture value setting resistors 117 and 118 are then parallel connected to the resistor 120. Further, since the output level of the latch circuit 85 changes to HL in this case, the transistor 113 also become conductive to parallel connect the resistor 116 to the resistor 120.

Accordingly, the amplifier 123 produces and transmits, through the terminal b to the camera side a voltage of a value corresponding to the aperture value F3 which is determined by the voltage dividing ratio of the voltage dividing circuit 116–120. Further, in this case also, the LED 104 does not light up. Since the outputs of all the latch circuits 85–87 are at HL's, the photometric circuit of the light control circuit becomes ready to be set for the aperture value F3, or, for example, F8.0 in F-number.

With the preliminary flashing performed in the manner as has been described above and after this action and the actions for adjusting the phototaking lens and for setting the light control level of the flash device have been confirmed, a mirror (not shown) is uplifted as will be described later herein when the shutter release button is further depressed to a second stroke position thereof. Also, with the release button depressed to the second stroke position, the diaphragm aperture of the phototaking lens (not shown) is determined according to the aperture value determined by the above stated preliminary flashing action. After these actions and other known actions have been performed, when a shutter (not shown) is fully opened and a synchronizing contact (not shown) is operated, the synchronizing terminal c is grounded Then, the AND gate 132 changes to an HL the one-shot circuit 131 is triggered. The circuit 131 produces an HL signal for a length of time required for flash photographing, for example, for a period of 5 to 6ms. Therefore, the transistor 68 which has become conductive in synchronism with the rise of the signal from the one-shot circuit 130 again becomes non-conductive to render thereby the photometric circuit of the light control circuit operative. Since the signal from the one-shot circuit 131 triggers the trigger circuit 10, an electrical energy is supplied from the main capacitor 9 to the main discharge tube 13 in a known manner. The discharge tube flashes to illuminate the object to be photographed. With the main flashing action begun in this manner, a reflection light which comes from the object as a result of the main flashing reaches the phototransistor 23. Then, the capacitor 57 of the distance measuring photometric circuit and the photocapacitor which has been selected at the time of preliminary flashing, i.e. the capacitor 60 for example, begin to be charged. When the charge levels of these capacitors 57 and 60 reach a predetermined level, the output level of the comparator 73 becomes HL. This causes the output level of the AND gate 81 to become an HL. The HL output of the AND gate 81 triggers the thyristor 19 to interrupt the main flashing in a known manner to ensure a proper exposure for the flash photographing operation.

Figure 4:
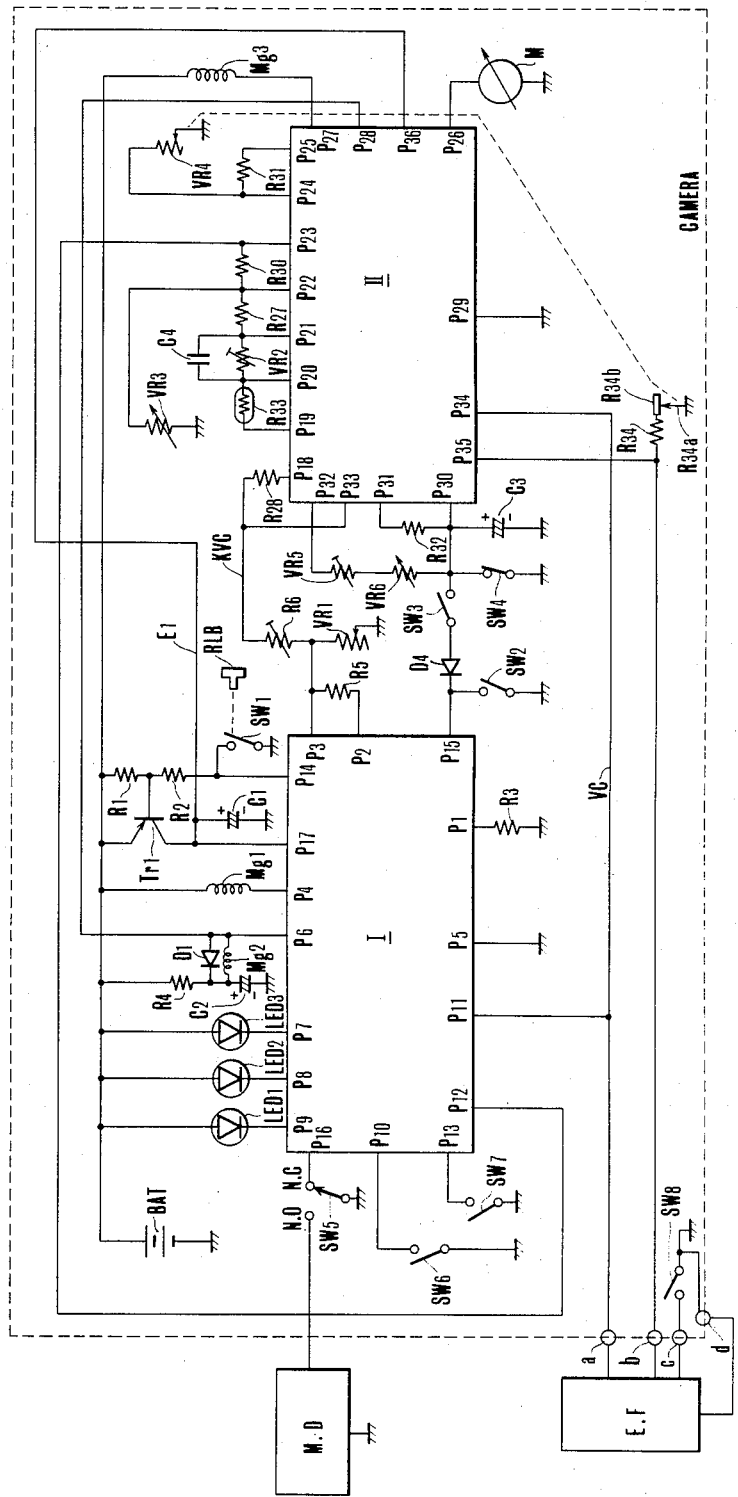
FIGS. 4 through 6 are circuit diagrams showing a single-lens reflex camera included in the above stated flash photographic system as an embodiment of the invention.
Figure 5:
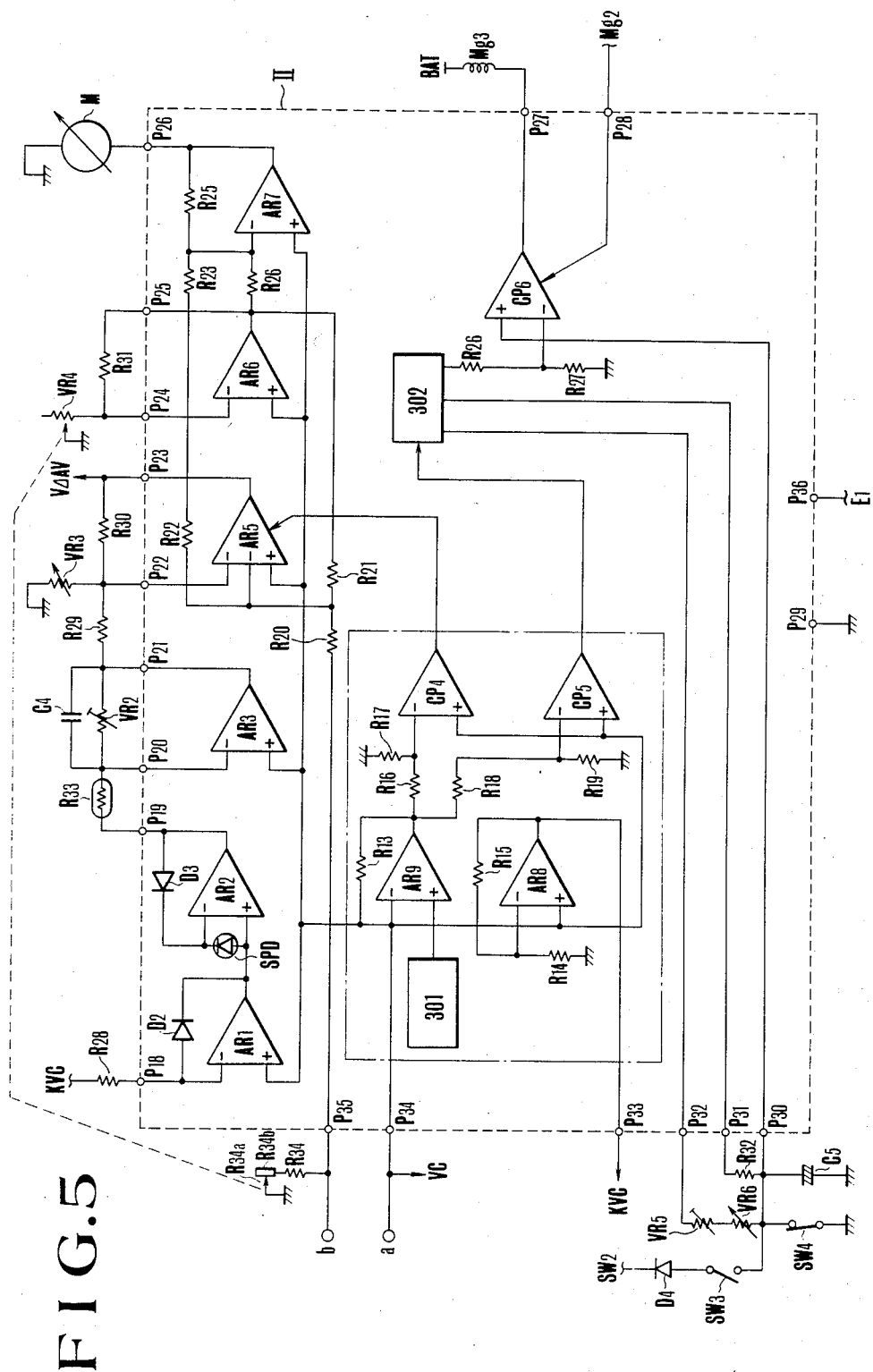
Figure 6:
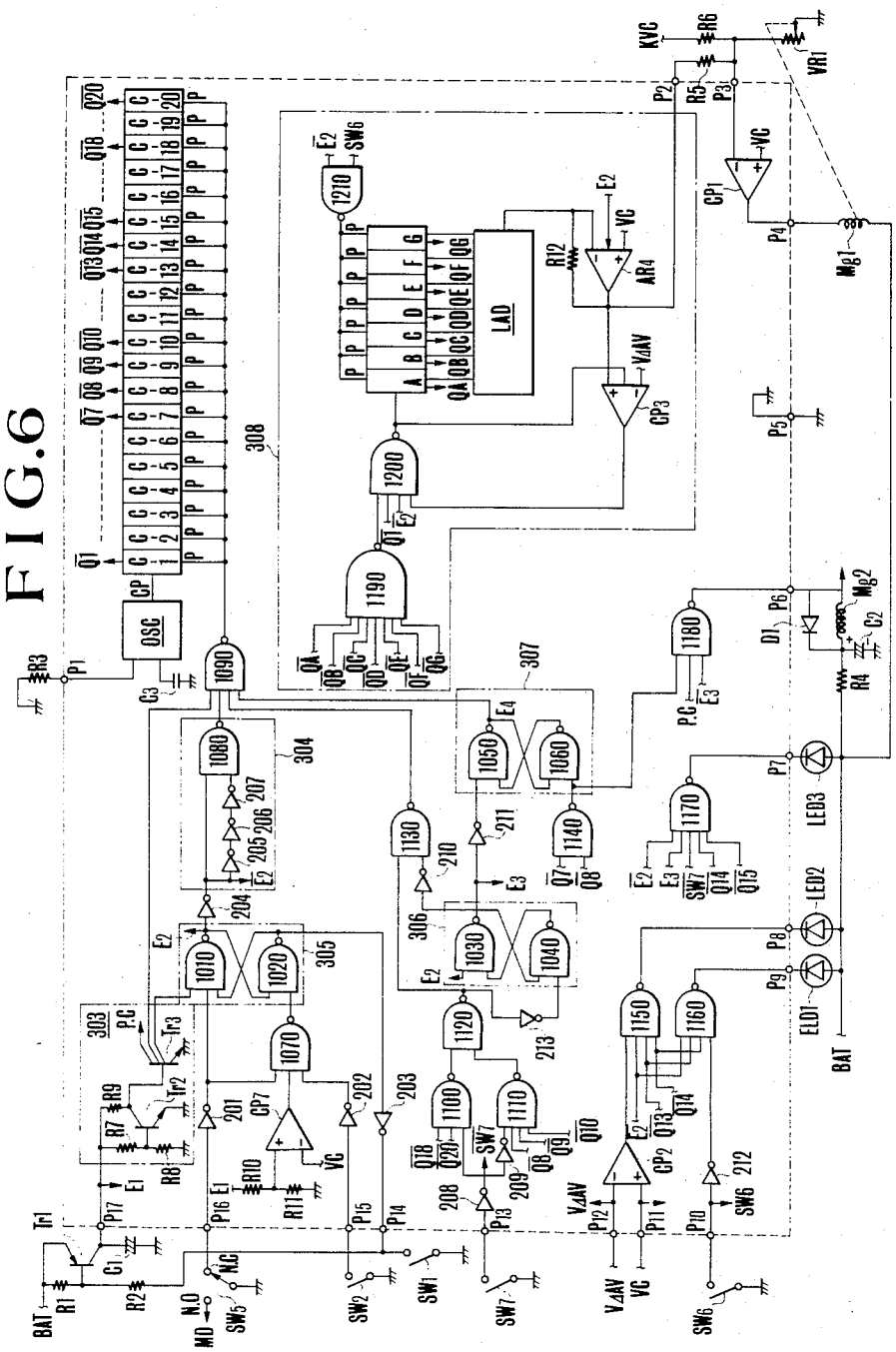

The single-lens reflex camera to be used in combination with the flash device shown in FIGS. 1 through 3 is arranged as shown in FIGS. 4 through 6.

The electrical circuit arrangement of the camera is as shown in FIG. 4, in which: the part enclosed with a broken line represents elements disposed within the camera body. A block MD represents a motor drive device while another block EF represents the flash device which has been described in the foregoing with reference to FIGS. 1 through 3. Further, reference symbols a, b, c and d indicate the terminals a, b, c and d which are shown in FIG. 1. In FIG. 4, a block I indicates an LSI which includes a sequence control part and an automatic exposure control part and is provided with input, output and external discrete part connecting terminals P1–P17. A block II indicates another LSI which includes a light measuring part, a computing part and a shutter time control part and is provided with terminals P18–P36 for the inputs and outputs thereof and for connecting external discrete parts. The camera includes an information display meter M; electromagnets Mg1, Mg2 and Mg3; a transistor Tr1 of a power supply holding circuit for holding a power supply from a power source BAT; display light emitting diodes LED-1–LED3; switches SW1–SW7; variable resistors VR1–VR7 for setting information, etc.; and a battery BAT used as power source.

Again referring to FIG. 4, the switch SW1 turns on when a shutter release button RLB is depressed to a first stroke position thereof. The switch SW2 turns on when the shutter release button RLB is depressed to a second stroke position thereof. The switch SW3 turns on at the time of a bulb exposure. The switch SW4 is a count switch which is arranged to be turned off when the shutter is opened. The switch SW6 is an automatic-manual photographing change-over switch and is arranged to turn on at the time of manual photographing. The switch SW7 is for self-timer photography and is arranged to turn on when a self-timer is used. Another switch SW5 is a change-over switch which is arranged to effect switch-over alternately between a film winding action and a phototaking action of the camera when a photographing operation is performed using the motor drive device MD. The switch SW5 shifts its position to one side N.C upon completion of a film winding action and to the other side N.0 upon completion of the travel of the trailing curtain of the shutter. There is further provided a switch SW8 which serves as a known synchronizing contact and is arranged to turn on when the shutter fully opens. The magnet Mg1 is for automatic exposure control. The magnet Mg2 is for initiating the operation of the camera. Another magnet Mg3 is for shutter time control.

In the camera of FIG. 4, the circuit element II analogically performs light measuring, computing and shutter time controlling actions. The circuit element I digitally performs aperture control for automatic exposure and sequential control over various kinds of photographing modes. These actions will be further described in detail below with reference to FIGS. 5 and 6.

FIG. 5 shows the details of the arrangement of the circuit II shown in FIG. 4. In FIG. 5, a reference numeral 301 indicates a constant voltage source which produces a constant voltage. The output terminal of the constant voltage source 301 is connected to the non-inversion input terminal of an operational amplifier AR9. Between the inversion input terminal and the output terminal of the operational amplifier AR9, is connected a feedback resistor R13. The inversion input terminal of the amplifier is connected to a terminal a disposed on the camera side. The potential of the non-inversion input terminal of the amplifier 301 is equal to that of the inversion input terminal. Such being the arrangement, the amplifier produces the above stated constant voltage to the terminal a. The output terminal of the amplifier AR9 is connected to the input terminals (−) of comparators CP4 and CP5. The input terminals (+) of these comparators CP4 and CP5 are connected to the inversion input terminal of the amplifier AR9. The comparators forms a photographing mode change-over circuit in conjunction with a shutter time change-over circuit 302. A variable resistor VR6 is arranged to have a resistance value corresponding to a preset shutter time value in response to a shutter dial. A fixed resistor R32 serves as a shutter time information source for flash photography. A capacitor C5 forms a time constant circuit in conjunction with the above stated resistor VR6 or R32. A count switch SW4 is arranged to turn off in response to the travel of a leading shutter curtain. The output terminal of the above stated time constant circuit has the input terminal (+) of a comparator CP6 connected thereto. The input terminal (−) of the comparator CP6 is arranged to have a reference voltage impressed thereon through resistors R26 and R27. A magnet Mg3 is arranged to hold the trailing shutter curtain. A shutter time control circuit is formed by these circuit elements. The above stated change-over circuit 302 is connected to the variable resistor VR6 and the resistor R32 which form the shutter time control circuit. The change-over circuit 302 is thus arranged to connect the resistor R32 to the capacitor C5 in response to an LL output of the comparator CP5 and to connect the variable resistor VR6 to the capacitor C5 in response to an HL output of the comparator CP5.

The above stated amplifier AR9 has its inversion input terminal connected to the non-inversion input terminal of another operational amplifier AR8. The operational amplifier AR8 has its inversion input terminal connected to the ground through a resistor R14 and has a resistor R15 connected to the feedback path thereof. The above stated constant voltage is multiplied K times by this amplifier AR8.

There is provided a silicon photo diode SPD for light measurement. The diode SPD is connected between the input terminals of an operational amplifier AR2. The amplifier AR2 has a diode connected to the feedback path thereof for logarithmic suppression and thus forms a photometric circuit. Another operational amplifier AR1 has a diode D2 connected between its input terminals while the output terminal thereof is connected to the non-inversion input terminal of the above stated amplifier AR2. A posistor R33 is connected to the output terminal of the photometric circuit and is arranged to form a termperature compensating circuit in conjunction with the amplifier AR1. A variable resistor VR2 and a capacitor C4 are connected in parallel between the inversion input terminal and the output terminal of an operational amplifier AR3, which forms a compensating circuit to compensate for a flicker included in a light measurement output. A variable resistor VR3 is arranged to permit setting a shutter time value and film sensitivity information. An operational amplifier AR5 has first and second inversion input terminals. The first inversion input terminal of the amplifier AR5 is connected to the above stated variable resistor VR3 and the amplifier AR3 while the second inversion input terminal is connected to the terminal b mentioned in the foregoing. This amplifier AR5 forms a computing circuit which computes information supplied to the first input terminal (for daylight or natural light photography) in response to an HL output of the comparator CP4 and also computes information supplied to the second input terminal (for flash photography) in response to an LL output of the comparator CP4. A variable resistor VR4 is provided for setting information on the full aperture F-number of a lens mounted on the camera. The resistance value of the variable resistor VR4 is arranged to be variable by a signal transmission pin of the lens which is not shown and thus varies according to the full aperture F-number of the lens. This variable resistor VR4 is connected to an operational amplifier AR6 while a resistor R31 is connected to the amplifier. This amplifier AR6 forms a full aperture signal forming circuit which produces a voltage corresponding to the full aperture value. The outputs of the amplifiers AR5 and AR6 are computed by another operational amplifier AR7. The camera is further provided with a display meter M; a resistor R34 which has an impedance related to information on the full aperture F-number of the phototaking lens to be used; a fixed contact R34b of the resistor R34; and a movable contact R34a which is arranged to be responsive to the above stated variable resistor VR4. This movable contact R34a is arranged to connect with the contact R34b when a full aperture value set at the resistor Vr4 is larger than the aperture value F1 shown in FIGS. 2(a) and 2(b), or, for example, when the full aperture value is above F2.0 and to be detached from the contact R34b when the set full aperture value is less than the aperture value F1. With the movable contact R34a arranged in this manner, there is formed a full aperture information source which transmits full aperture F-number information to the terminal b in the form of an impedance value.

The circuit arrangement shown in FIGS. 4 and 5 operates as follows: When the switch SW1 turns on with the shutter release button RLB (FIG. 4) depressed, the transistor Tr1 (FIG. 4) turns on to effect power supply through the power supply holding circuit. In the case of flash photography, the flash device which is shown in FIGS. 1-3 performs a preliminary flashing action in the manner as has been described in the foregoing at the beginning of the power supply. With the power supply commenced, the light receiving photogalvanic element SPD (FIG. 5) which has received a light from an object to be photographed produces a photo current corresponding to the brightness of the object. The signal thus obtained is amplified by the operational amplifier AR2 which has the diode D3 of a logarithmic characteristic connected to the feedback path thereof. Then, the amplifier AR2 produces brightness information BV. To compensate for a variation of the logarithmic diode D3, there is provided an operational amplifier AR1 which has a diode D2 of the same characteristic in the feedback path thereof while a posistor R33 is provided on the output side of the operational amplifier AR2. The output of the amplifier AR2 is supplied to the operational amplifier AR3 through this posistor R33. At this amplifier AR3, the high frequency component of the input signal is attenuated according to the characteristic of the capacitor C4 and that of the variable resistor VR2 in such a way as to eliminate output fluctuations due to the above stated flicker. The brightness information BV from the amplifier AR3 is supplied to the inversion input terminal of the operational amplifier AR5 through the resistor R29. Meanwhile, the inversion input terminal of the amplifier AR5 at that time has received shutter time information TV and film sensitivity information SV which have been set at the variable resistor VR3. The operational amplifier AR5 computes these values of information and produces aperture step number information V$\Delta$Av. This information is taken out from the terminal P23 and is sent to the sequence control and automatic exposure control circuit I which is arranged as shown in FIG. 4. This aperture step number information V$\Delta$Av is compounded with the full aperture F-number information AVO which is set at the variable resistor VR4. The circuit I then produces information AV which corresponds to the aperture value. The information AV is displayed by the aperture value display meter M, for example, within a view finder or the like. Further, when the magnet Mg2 which initiates the operation of the camera is excited as will be described later herein, the signal of the magnet Mg2 is transmitted from the terminal P28 to the comparator CP6 to control the comparator CP6. Another magnet Mg3 is excited by the output of the terminal 27 and then holds the trailing shutter curtain. Further, when the shutter begins to operate, the switch SW4 turns off in response to the start of the leading shutter curtain. The capacitor C5 then begins to be charged through the resistors VR5 and VR6 of the time constant circuit. Further, at the time of flash photography, the synchronizing contact SW8 which is shown in FIG. 4 closes when the shutter is fully opened. With the synchronizing contact SW8 closed, a main flashing action is performed through the process which has been described in the foregoing. The terminal voltage of the capacitor C5 is impressed on the non-inversion input terminal of the comparator CP6. This signal and a voltage from the change-over circuit 302 are voltage divided through the resistors R26 and R27. A divided voltage thus obtained and the reference voltage are compared with each other at the comparator CP6. When these voltage values come to coincide with each other, the comparator CP6 changes its output to demagnetize the magnet Mg3 which has been holding the trailing shutter curtain and to allow the trailing curtain to travel. With the trailing curtain allowed to travel, a photographing operation come to an end. When the trailing shutter curtain is brought to a stop, the change-over switch SW5 which is shown in FIG. 4 shifts its position to one side N.O and thus resets the circuit. In FIG. 5, a portion of the circuit arrangement which is enclosed with a one-dot-chain line represents an arrangement to perform photographing mode change-over control in accordance with distance information received from the flash device shown in FIG. 1 at the time of flash photography and to shift the shutter time to flash photographing shutter time. The amplifier AR5 and the change-over circuit 302 are arranged to be controlled by the output of this portion.

More detailed description of the camera according to the invention is as follows: When the flash device EF shown in FIG. 1 becomes ready for flashing, that is, when the charge level of the main capacitor 9 reaches a predetermined value, the output level of the comparator 50 becomes HL and the transistor 41 turns on. Then, as viewed from the camera side, there obtains a condition in which the resistor 56 is connected between the terminal a and the ground. Therefore, a current flows from the camera side through the terminal a. However, in cases where either the flash device is not connected to the camera or the flash device is not yet ready for flashing, no current flows from the camera side through the terminal a. Then, the output level of the operational amplifier AR9 shown in FIG. 5 is equal to the voltage of the constant voltage source 301. This output voltage of the amplifier AR9 is divided by the resistors R16, R17, R18 and R19 and impressed on the inversion input terminals of the comparators CP4 and CP5. Meanwhile, the voltage which is equal to the constant voltage source 301 is supplied to the non-inversion input terminals of these comparators. Therefore, the comparators CP4 and CP5 are not inverted and produce HL outputs. This leaves the position of the change-over circuit 302 unchanged. Shutter time control is performed according to the preset shutter time set at the variable resistor VR6. Meanwhile, the resistor 30 is connected to the amplifier AR5. The amplifier AR5 then computes the output of the above stated photometric circuit, the shutter time information and the film sensitivity information from the variable resistor VR3 and produces the aperture information VΔAv therefrom.

In case where the flash device is used, the transistor 41 turns on upon completion of preparation of the flash device for flashing. A current then flows in through the resistor 56 according to the constant voltage supplied to the terminal a from the camera side. At the terminal a, there flows a current i=Vct/R56, wherein Vct represents a constant voltage sent out from the camera side to the terminal a in response to a depressing operation on the shutter release button to the first stroke position thereof and R56 the resistance value of the resistor 56.

The value of this current is then detected by a detection circuit disposed on the camera side and the mode of the camera shifts from a daylight photography mode to a flash photography mode. More specifically, the current i=Vct/R56 flows to the terminal a shown in FIG. 1 through the terminal a of FIG. 5. This current causes the output potential of the amplifier AR9 to increase by as much as the resistor R15×i. The comparators CP4 and CP5 then produce LL outputs. As a result of that, the amplifier AR5 shifts to a flash photographing computation mode. The change-over circuit 302 connects the resistor R32 to the capacitor C5 to form a shutter time circuit for flash photography. The feedback resistor of the amplifier AR5 is shifted to the resistor R22. In other words, at the time of flash photography, a voltage which corresponds to the above stated aperture value is impressed on the resistor 20 through the terminal b of the flash device EF. The voltage is then computed by the amplifier AR5 through the resistors 21 and 22. The amplifier AR5 then produces aperture step number information VΔAv for flash photography. Further, the outputs of the amplifiers AR5 and AR6 are computed through the resistors R23-R25 and the amplifier AR7. The meter M displays aperture information impressed on the terminal b from the flash device.

The change-over circuit 302 impresses a voltage on the variable resistor VR5 when the output level of the comparator CP5 is high and impresses the voltage on the resistor R32 when the output level of the comparator CP5 is low. In other words, with the flash device becoming ready for flashing, the magnet Mg3 is controlled by the flash photographing shutter time corresponding to the time constant of the resistor R32 and the capacitor C5. Under conditions other than the condition in which the flash device is ready for flashing, the magnet Mg3 is controlled according to the time constant of the shutter time information resistor VR6, the variable resistor VR5 and the capacitor C5.

FIG. 6 is a circuit diagram showing the details of the circuit portion I shown in FIG. 4. This portion of the circuitry is arranged as a digital control circuit. This digital control circuit I is provided with terminals P1-P17 for connecting external discrete elements or circuits to these terminals respectively. Referring now to FIG. 6, the circuit includes binary counters C1-C20; preset input terminals P; outputs $\overline{Q1}$-$\overline{Q20}$; and a clock pulse input terminal CP. When an input P is at an HL, the level of an output Qn becomes HL while the level of an output $\overline{Qn}$ becomes LL. Further included in the digital circuit arrangement are: A clock pulse oscillator OSC which produces clock pulses at a period or cycle determined by the time constant of a resistor R2 and a capacitor C2; an AD-DA comparator 308; binary counters A-G of the comparator 308; a resistance circuit network LAD; a power up clear circuit 303; a one-shot circuit 304; flip-flop circuits 305, 306 and 307; NAND gates 1010-1210; inverters 201-213; an operational amplifier AR4; comparators CP1, CP2, CP3 and CP7; and an information setting variable resistor VR1 which operates in relation to the aperture value of a lens which is not shown. Further referring to FIG. 6, the operation of the camera is as follows:

(1) Let us assume that the camera is in a state of having completed a film winding process; the shutter release button RLB (see FIG. 4) is in a state of having been depressed to the first stroke position thereof; and, with the film winding process completed, the position of the switch SW5 has been shifted from the side or contact N.O to the other side N.C. With the button RLB depressed to the first stroke position, the switch SW1 turns on. This causes the transistor Tr1 of the power supply circuit to turn on to render the circuit operative. Then, the level of the output voltage E1 of the power supply circuit becomes HL. Under this condition, the clock pulse oscillator OSC is actuated to supply clock pulses to the counter C1. Further, with the output E1 supplied, the capacitor C1 is charged. Therefore, the transistor Tr2 which is off at the beginning comes momentarily turn on. This causes the output level of the power up clear circuit 303 to momentarily become LL. The output level of the NAND gate 1090 momentarily becomes HL to preset the counters C1-C20. The flip-flop (hereinafter will be called FF) 305 is also set at an initial state, i.e. the output E2 thereof is set at an HL. The FF 306 is also set into an initial state by the inversion output $\overline{E2}$ of the output E2. Then, the level of the output E3 of the FF 306 becomes HL. Then, the inversion output $\overline{E3}$ of the output E3 sets the FF 307 into an initial state. The output E4 of the FF 307 is then set at an HL. The HL output E4 causes the level of a preset input of the AD-DA converter 308, i.e. the output of the NAND gate 1210 to become HL. The HL output of the NAND gate 1210 then presets the counters A-G. Since the output E2 is at an HL, the operational amplifier AR4 is controlled and the output of the amplifier is connected to the ground. Since the output level of the comparator CP1 is HL at that moment, the magnet Mg1 which is for automatic exposure control (hereinafter will be called AE for short) is not excited under this condition. Under the condition described in this paragraph (1), therefore, all the outputs E1, E2, E3 and E4 are at HL's.

(2) When the camera is to be used in a manual photographing mode under the condition of Para. (1) above, the camera operates in the following manner: In this case, the switch SW6 is turned on. With the switch SW6 turned on, the output level of the inverter (Iv) 212 becomes HL. The above stated transistor Tr2 turns off from its operative state when the capacitor C1 is charged. This causes the level of one input of the NAND gate 1090 to become HL. Since the levels of all other inputs of the NAND gate 1090 are HL's at that time, the level of the output of the NAND gate 1090 immediately changes from HL to LL. Therefore, the counters C1-C20 begin to operate. Therefore, when the levels of both the outputs $\overline{Q13}$ and $\overline{Q14}$ become HL, the levels of all inputs of the NAND gate-1160 become HL and the NAND gate produces an LL output. This causes the LED 1, through the terminal P9, to produce an output. The LED 1 thus lights up to indicate that the camera is in the manual photographing mode.

(3) When the light from the object is below a reference value under the condition described in Para. (1) or (2): Since the photometric circuit shown in FIG. 5 has been operating since when the switch SW1 is turned on by the depressing operation on the shutter release button RLB to the first stroke position thereof as mentioned in the foregoing, the aperture step number information V$\Delta$Av is compared with the reference voltage Vc. Then, in this case, the information V$\Delta$Av becomes lower than the reference voltage Vc (V$\Delta$Av<Vc). Accordingly, the output level of the comparator CP2 becomes HL. Then, since the counters are in operation as mentioned above, the levels of all the inputs of the NAND gate 1150 become HL when the levels of both counter output $\overline{Q13}$ and $\overline{Q14}$ become HL and then the output level of the NAND gate 1150 becomes LL. This causes the LED 2 which is connected to the terminal P8 to light up and warns the photographer that the brightness of the object is low. The lights emitted by these LED's flicker according to the cycle of the counter and are arranged to be displayed, for example, within a view finder.

(4) When a photographing operation is caused to begin by depressing the shutter release button RLB to the second stroke position thereof, under the condition of Para. (1) above, after low brightness or the automatic or manual photographing mode has been confirmed through the operation described in Para. (2) and (3) above: The switch SW2 turns on in response to the depressing operation to the second stroke position. With the switch SW2 thus having turned on, the output level of the inverter 202 becomes HL. Meanwhile, since the switch SW8 is in contact with the contact NC, the output level of another inverter 201 is also at an HL. Under this condition, a divided voltage obtained from the voltage E1 is compared with the constant voltage Vc at the comparator CP7. When the former voltage value is sufficiently higher than the latter voltage value Vc (or if the power source voltage is sufficiently high), the output of the comparator CP7 is at an HL. Therefore, these signals make the levels of all the inputs of the NAND gate 1070 high to cause the NAND gate 1070 to produce an LL output.

Since this results in an HL output of the NAND gate 1020, the FF 305 is inverted and the level of its output E2 changes from HL to LL. Further, the output of the NAND gate 1020 changes the output level of the inverter 203 from HL to LL. As a result of that, the base resistors R1 and R2 of the transistor Tr1 are connected to the ground through the terminal P14. Therefore, even when the switch SW1 is turned off, the transistor Tr1 is kept on to hold the power supply to the circuits. Since the level of the output E2 thus becomes LL, the level of the output $\overline{E2}$ of the inverter 204 becomes HL to cause the output level of the one-shot circuit 304 to be at an LL for the length of delay time determined by the inverters 205, 206 and 207. As a result of this, the output level of the NAND gate 1090 momentarily becomes HL to preset thereby the counters C1-C20 again. After that, the output level of the NAND gate 1090 changes from HL to LL and the clock pulses from the pulse oscillator OSC begin to be counted. Further, with the level of the output E2 becoming LL, the control by the AD-DA converter 308 over the operational amplifier AR4 is removed and the output of the amplifier AR4 is released from the grounded state. This allows the output of the amplifier AR4 to be transmitted to the input terminal of the comparator CP1. Since the output of the amplifier AR4 corresponds to the set state of the counters A-G which are preset, the potential at the inversion input terminal of the comparator CP1 becomes high to invert the comparator CP1. With the comparator CP1 thus inverted, the magnet Mg1 for AE is excited. Under this condition, the level of the input signal $\overline{E2}$ to the NAND gate 1200 is high and the output levels of the comparator CP3 and the NAND gate 1190 are at HL's. Therefore, the signal of output $\overline{Q1}$ of the counter C1 is transmitted to the counters A-G of the AD-DA converter through the NAND gate 1200.

(5) When the camera is shifted to the manual mode (with the switch SW6 turned on) under the above described condition: The output level of the NAND gate 1210 of the converter 308 is at an HL to keep the counters A-G in a preset state. On the other hand, when the camera is shifted to the automatic photographing mode (with the switch SW6 off): The output level of the NAND gate 1210 changes from HL to LL and the counters A-G begin to count. Then, the output level of the operational amplifier AR4 drops stepwise. When the output of the amplifier AR4 becomes equal to the signal V∆Av from the photometric circuit, the comparator CP3 is inverted and produces an LL signal. The NAND gate 1200 then produces an HL output irrespectively of the output $\overline{Q1}$. This HL output of the NAND gate 1200 brings the counting action of the counters A–G to a stop to have a digital value corresponding to the signal V∆Av stored at the counters A–G. Adverse effects of noises introduced during the counting action of the counters can be eliminated by controlling the comparator CP3 with the output of the NAND gate 1200.

(6) When a self-timer is used under the condition described in Para. (4) above: The switch SW7 is turned on in this case. The output level of the inverter 208 is at an HL. Therefore, when both the counter outputs $\overline{Q18}$ and $\overline{Q20}$ become HL, the output level of the NAND gate 1100 changes from HL to LL. This causes the NAND gate 1120 to produce an HL output. The output level of the inverter 213 becomes LL and that of the NAND gate 1040 HL. Then, with the shutter release button RLB moving to the second stroke position thereof, the level of the output E2 becomes LL and that of the output $\overline{E2}$ HL. Therefore, the FF 306 is inverted and the level of its output E3 changes from HL to LL. Accordingly, the NAND gate 1130 produces an LL output. The output of the NAND gate 1090 becomes HL to preset the counters C1–C20 again. With the counters again preset, the levels of their outputs $\overline{Q1}$–$\overline{Q20}$ become LL. This results in an LL output of the NAND gate 1120 to bring the output level of the NAND gate 1130 back to an HL. Therefore, the output level of the NAND gate 1090 becomes LL to have the counting action resumed. Therefore, the output level of the NAND gate 1180 remains at an LL to have the magnet Mg2 excited until the levels of both the counter outputs $\overline{Q7}$ and $\overline{Q8}$ become HL after the level of the output E2 has changed from HL to LL. With the magnet Mg2 thus excited, a camera operation starting member which is not shown is actuated to initiate a phototaking operation. In other words, with the self-timer used, the count begins when the shutter release button RLB comes to its second stroke position. Then, shutter time control pulse is produced after the lapse of time required for counting until the levels of both the outputs $\overline{Q18}$ and $\overline{Q20}$ become HL.

(7) When the camera is in the automatic photographing mode without using the self-timer: The switch SW7 is off in this case. Accordingly, the output of the inverter 208 is at an LL, that of the inverter 209 at an HL and the output level of the NAND gate 1110 changes from HL to LL when the levels of the counter outputs $\overline{Q8}$, $\overline{Q9}$ and $\overline{Q10}$ all become HL's. Therefore, the level of the output E3 of the FF 306 changes from HL to LL when the levels of the counter outputs $\overline{Q8}$, $\overline{Q9}$ and $\overline{Q10}$ all become HL after the shutter release button RLB comes to the second stroke position. In other words, with the self-timer not used, the level of the output E3 of the FF 306 becomes LL after the lapse of the count time of the counters until the levels of the outputs $\overline{Q8}$, $\overline{Q9}$ and $\overline{Q10}$ become HL after the release button RLB has come to the second stroke position. Compared with the above stated self-timer photography, the camera operation starting member (not shown) is actuated in a shorter time. Further, when the level of the output E2 becomes LL with the release button RLB brought to its second stroke position, the output levels of both the NAND gates 1150 and 1160 become HL to extinguish the displays made by the LED 1 and LED 2.

Further, when the level of the output E2 becomes LL with the self-timer used, the level of the output $\overline{E2}$ becomes HL. When the levels of both the counter outputs $\overline{Q14}$ and $\overline{Q15}$ become HL while the output E2 is at an HL with the switch SW7 turned on, the output level of the NAND gate becomes LL to cause the LED 3 to flicker through the terminal P7. The flicker of the LED 3 indicates that the self-timer is in use. When the level of the output E3 becomes LL after completion of the self-timer operation, the output level of the NAND gate 1170 become HL to extinguish the LED 3. Further, when the level of the output E3 changes from HL to LL after completion of the self-timer operation as mentioned above, the output level of the inverter 211 becomes HL and the level of the output E4 of the FF 307 also becomes HL. Then, since the output $\overline{E3}$ is at an HL, the output level of the NAND gate 1180 remains at an LL until the levels of both the counter outputs $\overline{Q7}$ and $\overline{Q8}$ become HL. Further, with the camera operation starting magnet Mg2 excited to initiate a phototaking operation of the camera, when the levels of both the counter outputs $\overline{Q7}$ and $\overline{Q8}$ become HL as mentioned above, the output level of the NAND gate 1140 becomes LL to interrupt the exciting process on the magnet Mg2. Further, with the magnet Mg2 excited, an excitation signal of the magnet Mg2 is impressed on the control terminal P28 of the comparator CP6 which is shown in FIG. 5. Then, the output level of the comparator CP6 becomes LL to excite another magnet Mg3 and thereby to hold the trailing shutter curtain. At the same time, the FF 307 is inverted and the level of the output E4 changes from HL to LL. This results in an HL output of the NAND gate 1090 which brings the counters C1–C20 into a preset state. With the magnet Mg2 excited, the starting member (not shown) initiates a phototaking operation as mentioned above. Then, in response to this, known members come to perform a mirror uplifting action, to release the variable resistor VR1 for aperture information from a locked state, and to drive a diaphragm to stop down the aperture thereof. With the slider of the variable resistor VR1 thus operated, the output of the operational amplifier AR4 is compared with the reference value Vc at the comparator CP1. When the two values come to coincide with each other, the output level of the comparator CP1 changes to an HL. The HL output of the comparator CP1 excites the AE control magnet Mg1. The aperture of the phototaking lens is clamped to determine the aperture value of the lens. At this instant, a member which is not shown causes the leading shutter curtain to travel. With the leading curtain caused to travel, the switch SW4 shown in FIG. 5 turns off. This allows the capacitor C5 to be charged through the resistors VR5 and VR6. After the lapse of set shutter time, the comparator CP6 is inverted to have the magnet Mg3 no longer excited. Then, the trailing shutter curtain is allowed to travel to bring the phototaking operation to an end.

When the flash device EF is ready for flashing with the flash device mounted on and connected to the camera shown in FIGS. 4–6 through the terminals a, b, c and d shown in FIG. 4, the output V∆Av of the operational amplifier AR5 becomes a value corresponding to the aperture information voltage from the flash device which is impressed on the terminal b as mentioned in the foregoing. Since the voltage V∆Av applied to the input terminal (−) of the comparator CP3 of FIG. 6 is also the same, the content of the aperture information produced from the flash device is A/D converted by the A/D converter 308. Then, the AE control magnet Mg1 is controlled of course in the same manner as in the case where no flash device is connected to the camera and the aperture value of the phototaking lens which is not shown is determined accordingly.

With the phototaking operation coming to an end as mentioned above, the position of the switch SW5 is shifted from one side N.C to the other side N.O in response to the travel of the trailing shutter curtain. The motor drive device MD then begins to perform a film winding action. Under this condition, the output level of the inverter 201 becomes LL. The FF 305 is inverted. The level of the output E2 changes from LL to HL. The output level of the inverter 203 also changes from LL to HL. If the switch SW1 has been turned off, therefore the transistor Tr1 of the power supply circuit is turned off to release the power source from the supply holding state. This brings the camera back to the original condition before the start of photographing.

In the foregoing description, the single-frame or non-continuous photographing operations of the camera have been described. In case where a continuous photographing operation is to be performed with the motor drive device MD, the camera operates in the following manner: In this case, the shutter release button is kept depressed to the second stroke position thereof. Accordingly, the switches SW1 and SW2 are kept on. When the switch SW5 is shifted from one side N.C to the other side N.O after completion of the phototaking operation and when the level of the output E2 becomes HL as mentioned above, the level of the output $\overline{E3}$ becomes LL to invert the FF 306 and to make the level of the output E3 high (HL). This in turn inverts the FF 307 to cause the output E4 to become HL. The output level of the NAND gate 1090 then changes from HL to LL. The counters C1–C20 again begin to count and the above stated display action is performed.

Under this condition, with the switches SW1 and SW2 being kept on, the power supply from the power source BAT is maintained by the transistor Tr1 and the output of the inverter 202 is at an HL. Accordingly, when the switch SW5 shifts to the side N.C after completion of a film winding action, the output level of the inverter 201 changes from LL to HL to invert the FF 305 and to cause the level of the output $\overline{E2}$ to change from LL to HL. This causes the one-shot circuit 304 to momentarily produce an LL output as mentioned in the foregoing. As a result of this, the operation of the camera begins in the same sequence of processes as those described in the foregoing.

In accordance with this invention, even when a bright lens of the camera is replaced with a dark lens, the invention enables the photographer without requiring any special operation to perform flash photographing in a completely automatic manner by coming closer to the object after completion of preliminary flashing before main flashing. Further, since the same terminal is used for transmitting full aperture F-number informaion from the camera side and also for transmitting light control aperture information from the flash device, the number of signal terminals required for connection between the camera and the flash device can be reduced to prevent inadequate contact that tends to result from use of many connection terminals.

What we claim:

1. An electronic flash photographic device comprising:
    flash means for pre-emitting a flash light before a shutter release and for emitting a main flash light when a shutter is opened;
    a first control circuit for controlling an emission of the pre-emitting flash light;
    a first detecting circuit for detecting a quantity of a pre-emitting flash light reflected from an object to be photographed and for producing an aperture setting signal to set the aperture of a taking lens and a signal for determining a light termination level at which the emission of the main flash light is stopped;
    a second detecting circuit for detecting a quantity of a main flash light except for that passed through the lens and for producing a stop signal to terminate the emission of main flash light at the light termination level to be set in relation to the emission control of pre-emitting flash light; and
    a correction circuit for correcting the light termination level, in relation to the F-number of full aperture of the taking lens mounted on the device.

2. An electronic flash photographic device according to claim 1, further comprising indication means for indicating the aperture value of the taking lens to be set in relation to the emission of pre-emitting flash light.

3. An electronic flash photographic device according to claim 1, wherein the correction circuit corrects the light termination level to a level corresponding to a predetermined aperture value in relation to the emission of pre-emitting flash light when the F-number of full aperture of the mounted taking lens is larger than a predetermined F-number.

4. An electronic flash photographic device according to claim 3, wherein the correction circuit produces a correction signal to set the mounted taking lens aperture to the full aperture value when the F-number of full aperture of the mounted taking lens is larger than a predetermined F-number in relation to emission of pre-emitting flash light.

5. An electronic flash photographic device comprising:
    (A) a camera device, including:
        means for producing, at a strobo device, a full aperture signal corresponding to the F-number of full aperture of a taking lens mounted on the camera; and
    (B) a strobo device, including:
        flash means for pre-emitting a flash light before a shutter release and for emitting a main flash light when a shutter is opened;
        a first control circuit for controlling an emission of the pre-emitting flash light;
        a first detecting circuit for detecting a quantity of a pre-emitting flash light reflected from an object to be photographed and for producing an aperture setting signal to set the aperture of a taking lens and a signal for determining a light termination level at which the emission of the main flash light is stopped and for transmitting said aperture setting signal to said camera device;
        a second detecting circuit for detecting a quantity of a main flash light and for producing a stop signal to terminate the emission of main flash light at the light termination level to be set in relation to the emission control of pre-emitting flash light; and a correction circuit for correcting the light termination level according to said full aperture signal.

6. An electronic flash photographic device according to claim 5, wherein said full aperture signal and the aperture setting signal are transmitted through a common signal line.

7. An electronic flash photographic device according to claim 6, wherein the full aperture signal is a current value flowing through said common signal line, while the aperture setting signal is a voltage value flowing through said common signal line.

8. An electronic flash photographic device according to claim 5, wherein the means to produce the full aperture signal at the strobo device comprises:

means for producing a signal of which the state may change depending on whether or not the F-number having a full aperture of the taking lens mounted on the camera is larger than a predetermined value;

wherein said aperture setting signal produced by the first detecting circuit is a signal to set the aperture to a value determined stepwise according to a quantity of a pre-emitting flash light, and said light termination level is a level corresponding to said aperture setting signal, and further wherein said correction circuit is a circuit to correct said aperture setting signal such that it is set to a value larger than said predetermined value from the stepwise determined values, as in the case when the F-number of a full aperture of the taking lens is larger than said predetermined value.

* * * * *